Patented Nov. 5, 1946

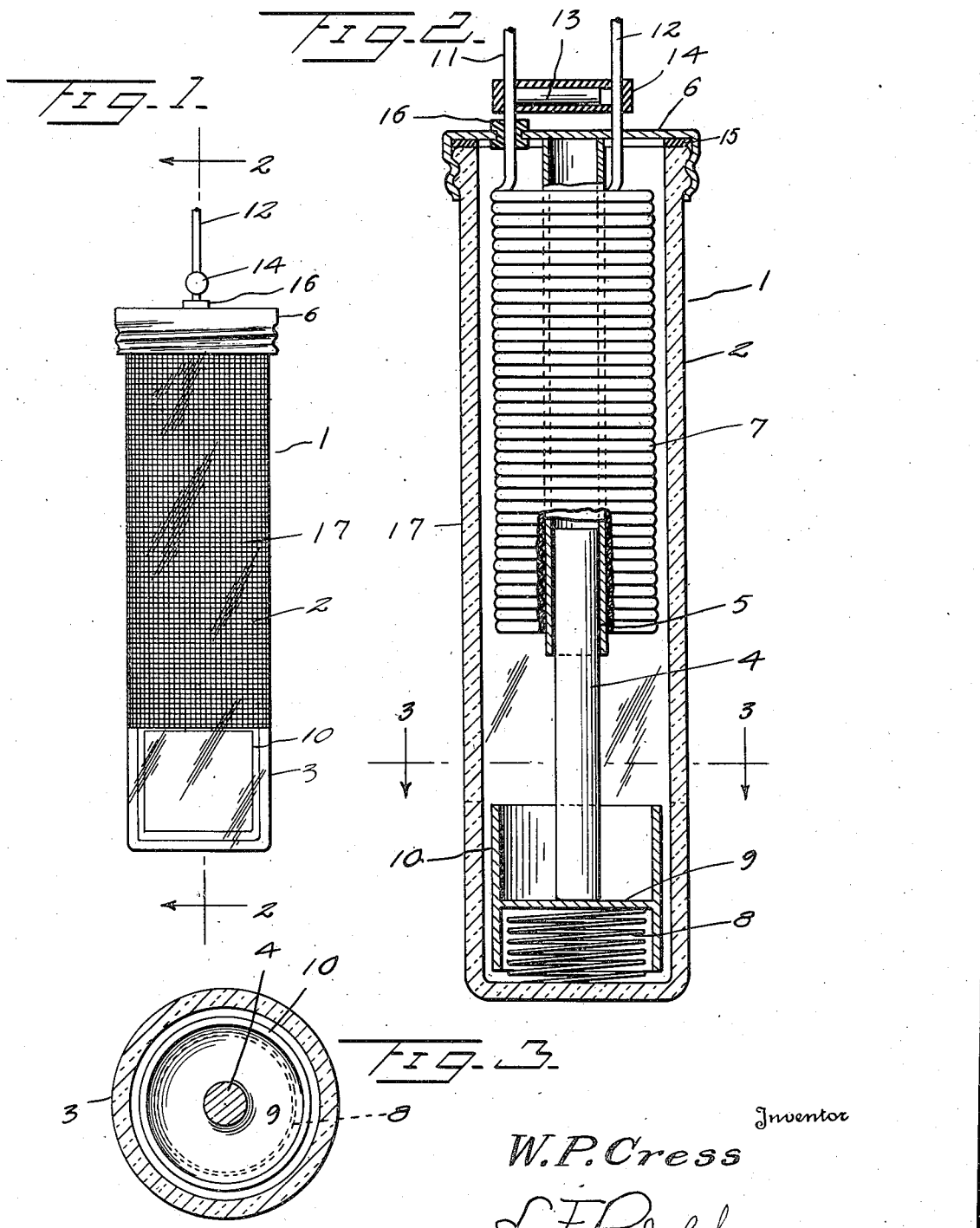

2,410,636

UNITED STATES PATENT OFFICE 2,410,636

SHORT-CIRCUIT INDICATOR

William P. Cress, Lebanon, Mo.

Application June 29, 1944, Serial No. 542,784

3 Claims. (Cl. 177—329)

This invention relates to electrical circuits and has for its object to provide a short circuit indicator.

Another object of the invention is to provide a short circuit indicator to be installed in series in a distribution line which carries alternating current to show if a short circuit prevails on the line.

Another object of the invention is to provide a short circuit indicator which may be installed in a main or tap line, and at such location that at a glance a trouble shooter may ascertain if trouble prevails on a certain line.

A further object of the invention is to provide a short circuit indicator provided with a movable signal which will clearly indicate in day or night whether or not there is trouble upon the line in which it is installed.

With the above and such other objects in view as may hereinafter more fully appear, I have invented the device shown in the accompanying drawing in which:

Figure 1 is an elevational view of my device.

Figure 2 is an enlarged view taken on the line 2—2 of Figure 1; and

Figure 3 is a section on line 3—3 of Figure 2.

Like reference characters indicate like parts throughout the following specification, and in the several views in the drawing in which 1 indicates a short circuit indicator which consists of a case 2 composed of transparent material, colored black throughout except for the lower portion thereof, indicated at 3. The case is preferably tubular and mounted centrally therein is a vertically disposed core 4 of steel tempered to retain magnetism over a long period of time. This core operates telescopically within a steel tube 5, suspended from a cap 6 of the case 2, and around which is wound a series coil 7, of insulated copper wire of desired gauge and correct number of turns for operation in a particular circuit. This coil is also suspended from the cap 6.

On the bottom of the case 2 is a coiled spring 8 seated under a partition 9 of a cup 10, and upon which the lower end of the core sits.

The terminals 11 and 12 of the coil are connected by a non-ferrous metal lightning arrester grip 13 enclosed in a fiber case 14, to prevent damage to the mechanism. The cap 6 is screw threaded to the casing, and is provided internally with a gasket 15 in order to keep the casing moisture proof. 16 is an insulating bushing for the coil. The terminals 11 and 12 connect in the circuit which is used in connection with the indicator.

The operation of the device is as follows: When short circuit or surge is imposed on the coil 7, the magnetism draws the core 4 into the tube 5, and at the same instant signal cup 10 is forced upward by spring 8, into the shaded portion 17 of the casing 2. After the line circuit breaker has opened, or fuse has been blown between the indicator and power supply, the core retains sufficient magnetism to hold it firmly in tube 5 then when the line fault has been cleared and the line reenergized, the normal current is insufficient to magnetically hold the core allowing it to fall upon the partition of the signal cup, its weight pressing it down against the tension of the spring 8, to its normal position, thus atomatically resetting the indicator to normal position. The outer surface of the cup is preferably white so as to be easily visible in contrast with the darkened portion of the casing. The position of the cup, of course, indicates the condition of the line.

I claim:

1. An electric circuit trouble indicator comprising a substantially opaque casing having a transparent end portion, a shell like indicating element normally located within the transparent portion of the casing, a circuit coil disposed longitudinally in the casing, a cap at one end of the casing provided with a tube projecting therefrom and through the coil, a magnetizable core slideable in the tube, said shell like indicator having a portion thereof in the path of the core, whereby the weight of the core will act to maintain the indicating element in a position visible through the transparent portion of the casing, and spring means normally urging the shell like indicating element away from the transparent end of the casing.

2. An electric circuit trouble indicator comprising a substantially opaque casing having a transparent end portion, a shell like indicating element normally located within the transparent portion of the casing, a circuit coil disposed longitudinally in the casing, a cap at one end of the casing provided with a tube projecting therefrom and through the coil, a magnetizable core slideable in the tube, said shell like indicator having a portion thereof in the path of the core, whereby the weight of the core will act to maintain the indicating element in a position visible through the transparent portion of the casing, said cap being removable to permit displacement of the parts, and spring means normally urging the shell like indicating element away from the transparent end of the casing.

3. An electric circuit trouble indicator comprising a substantially opaque casing having a transparent end portion, a shell like indicating element normally located within the transparent portion of the casing, a circuit coil disposed longitudinally in the casing, a cap at one end of the casing provided with a tube projecting therefrom and through the coil, a magnetizable core slideable in the tube, said shell like indicator having a portion thereof in the path of the core, whereby the weight of the core will act to maintain the indicating element in a position visible through the transparent portion of the casing, said cap being removable to permit displacement of the parts, and a spring interposed between one end of the casing and the structure in the indicating element for urging the indicating element to obscure position within the opaque casing when the core is drawn into the coil by magnetic influence.

WILLIAM P. CRESS.